United States Patent Office 3,168,569
Patented Feb. 2, 1965

3,168,569
METHOD OF BLEACHING POLYALKYLENE ETHERS
Paul Magnus Torkel Matell, Molndal, Sweden, assignor to Mo Och Domsjo Aktiebolag, Ornskoldsvik, Sweden, a corporation of Sweden
No Drawing. Filed Feb. 1, 1960, Ser. No. 5,641
2 Claims. (Cl. 260—584)

The present invention relates to a method of bleaching polyalkylene ethers, said method comprising contacting the product to be bleached with a complex borohydride, such as an alkali metal borohydride.

Polyalkylene ethers which term as used herein includes polyalkylene glycols of the type $$H(OR)_nOH$$

wherein R is an alkylene group, such as an ethylene or propylene group, and $n$ is an integer greater than 1, as well as polyalkylene glycol derivatives of the type $$H(OR)_nX$$

wherein R and $n$ are as hereinbefore defined and X is a residue of an organic compound containing a reactive hydrogen atom, such as an amine, an alcohol, a phenol or a carboxylic acid, are prepared by adding an alkylene oxide, such as ethylene oxide or propylene oxide, to water or reactive hydrogen containing compounds (such as those mentioned above). It was found that the compounds obtained in this manner are easily discolored, unless the reaction conditions are controlled with a high degree of accuracy.

In accordance with the present invention applicant has found that this disadvantage can be obviated and the discolored polyalkylene ethers can be bleached by contacting them with complex borohydrides. The complex borohydrides to be used in the process of this invention include primarily alkali metal borohydrides, such as lithium borohydride, sodium borohydride and potassium borohydride, but also borohydrides of other metals, such as magnesium, calcium, barium and strontium borohydrides.

The bleaching action of complex borohydrides seems to be specific for polyalkylene ethers, in that attempts to bleach other dark-colored substances with complex borohydrides have only in exceptional cases resulted in an appreciable reduction in color.

The amount of the complex borohydride which must be used to bleach polyalkylene ethers may vary considerably depending on the initial color of the substance to be treated and the desired degree of reduction in color. If the material to be treated is only slightly colored, a very small amount of the bleaching agent may result in a desired effect. Thus, in such cases, an appreciable reduction in color may be achieved by an amount of only 0.001% (based on the weight of the substance to be treated), but when the substance is more markedly colored it will generally be necessary to employ at least 0.1% and preferably 0.5% to achieve a desired reduction in color. If the substance to be treated is very highly dark-colored and a considerable bleaching is desired, it may of course be necessary to employ considerably greater amounts of the bleaching agent, but since complex borohydrides are expensive chemicals and the bleaching action does not appear to increase significantly with increasing amounts of borohydride above a particular limit, it will as a rule not be practical to employ more than 5% and preferably not more than 2%.

The temperature of treatment is not of critical importance and the treatment can be carried out at room temperature (25° C.) or lower temperatures. Preferably, however, higher temperatures will be used, since the bleaching action increases slightly with increasing temperature. However, the temperature should not be so high that the material treated is decomposed to a substantial extent, since this may result in the formation of new discoloring matter. Preferably a temperature range of 50-150° C. will be used.

Nor is the treatment time of critical importance, since the bleaching action is increased only insignificantly if the time of contact between the substance and the bleaching agent is increased.

The bleaching operation can be carried out by contacting the complex borohydride, in solid form or dissolved in a suitable solvent, with the substance to be bleached or a solution thereof in a suitable solvent, such as water, ethanol, benzene etc., provided that the complex borohydride is sufficiently stable in the presence of the particular solvent.

In a special embodiment of the invention, a complex borohydride may be present already in the preparation of the polyalkylene ether, whereby the appearance of a dark color in the product can be prevented. Thus, this embodiment can be considered as a bleaching of the product during formation thereof.

The invention is further illustrated by the following examples.

EXAMPLE 1

In a series of experiments various polyethylene ethers were contacted with 1% of sodium borohydride (based on the weight of the polyethylene ether treated) in powder form. The mixture of polyethylene ether and sodium borohydride was allowed to stand at 120° C. for one hour. The color of the substance prior to and after the treatment was determined according to the Gardner scale. The polyethylene ethers used and the results obtained are given in Table I below.

Table I

POLYETHYLENE ETHERS PREPARED BY ADDING $n$ MOLES OF ETHYLENE OXIDE TO A

| A | $n$ | Color Gardner units | |
|---|---|---|---|
| | | Untreated | Treated |
| Water | 9 | 9 | 5 |
| Ethanol | 3 | 10 | 5 |
| Nonylphenol | 10 | 9 | 3-4 |
| Lauryl alcohol | 6 | 1 | <1 |
| Tallow fatty alcohol | 5 | 6 | <1 |
| Mixture of oleyl and cetyl alcohol | 5 | 3 | 2 |
| Do | 80 | 6-7 | 3-4 |
| Oleylamine | 7 | 10 | 4 |
| Do | 7 | 12 | 6 |
| Do | 30 | 14 | 10 |

In another series of experiments, a number of other dark-colored products, namely aniline, nonylphenol, tall light oil, tall oil fatty acids, rape-seed oil fatty acid ethanolamide and a distillation residue from the preparation of 2-ethylhexanol, were treated with sodium borohydride under the same conditions as above. A hardly noticeable reduction in color was obtained with nonylphenol and tall oil fatty acid, while the other products had unchanged color.

EXAMPLE 2

A polyethylene ether prepared by adding 7 moles of ethylene oxide to oleylamine and having the color 10 on the Gardner scale, was treated wtih sodium borohydride under the conditions and with the results indicated in Table II below.

*Table II*

| $NaBH_4$, percent | Time, hrs. | Temp., °C. | Color Gardner units |
|---|---|---|---|
| 0.25 | 1 | 120 | 5 |
| 0.5 | 1 | 120 | 5 |
| 1.0 | 1 | 120 | 4 |
| 0.5 | 2 | 120 | 4 |
| 1.0 | 2 | 120 | 3 |

EXAMPLE 3

A polyethylene ether of the same type as in Example 2, but having the color 12 on the Gardner scale, was treated with sodium borohydride under the conditions and with the results indicated in Table III below.

*Table III*

| $NaBH_4$, Percent | Time, hrs. | Temp., °C. | Color Gardner units |
|---|---|---|---|
| 1.0 | 1 | 120 | 6 |
| 0.5 | 1 | 120 | 8 |
| 0.5 | 1 | 120 | 7 |
| 0.25 | 1 | 120 | 9 |
| 0.13 | 1 | 120 | 10 |
| 0.06 | 1 | 120 | 11 |
| 0.5 | 1 | 80 | 9 |
| 0.5 | 1 | 100 | 9 |
| 0.5 | 1 | 120 | 8 |
| 0.5 | 1 | 120 | 7 |
| 0.5 | 1 | 140 | 7 |
| 0.5 | 1 | 160 | 6 |
| 0.5 | 2 | 80 | 9 |
| 0.5 | 2 | 120 | 7 |

EXAMPLE 4

A polyethylene ether prepared by adding 6 moles of ethylene oxide to nonylphenol and showing the color 9 on the Gardner scale, was treated with sodium borohydride under the conditions and with the results indicated in Table IV.

*Table IV*

| $NaBH_4$, Percent | Time, hrs. | Temp., °C. | Color Gardner units |
|---|---|---|---|
| 0.5 | 1 | 120 | 4 |
| 0.2 | 1 | 120 | 4-5 |
| 0.5 | 2 | 120 | 3 |
| 0.2 | 2 | 120 | 3-4 |
| 0.5 | 1 | 150 | 3 |
| 0.2 | 1 | 150 | 4 |
| 0.5 | 1 | 180 | [1] 3 |
| 0.2 | 1 | 180 | [1] 4 |

[1] Change in color tone. Temperature probably too high.

EXAMPLE 5

A polyethylene glycol of molecular weight 300 was treated with 0.5% by weight of sodium borohydride, based on the polyethylene glycol, in the presence of solvent and in the absence of solvent, the treatment being continued until the evolution of gas had ceased. Conditions and results are indicated in Table V.

*Table V*

| Polyethylene glycol, percent | Solvent | Temp., °C. | Color Gardner units | |
|---|---|---|---|---|
| | | | Untreated | Treated |
| 100 | | 120 | 9 | 6 |
| 75 | Water | 95 | 8 | 5 |
| 75 | Toluene | 95 | 8 | 5 |

EXAMPLE 6

A polypropylene ether prepared by adding 8.5 moles of propylene oxide to oleylamine was treated with 0.5% of sodium borohydride for 1 hour at 120° C., whereby the color was changed from 11 to 8 on the Gardner scale.

EXAMPLE 7

A polyethylene glycol of the molecular weight of 300 was treated with 0.5% of potassium borohydride for 1 hour at 120° C., whereby the color was reduced from 9 to 6 on the Gardner scale.

EXAMPLE 8

A 60% ethanolic solution of polyethylene glycol of the molecular weight 300 was treated with 0.3% by weight of lithium borohydride, based on the polyethylene glycol for 1 hour at 75° C., whereby the color of the solution was reduced from 6 to 3-4 on the Gardner scale.

EXAMPLE 9

20.7 kgs. of an 85% aqueous solution of a polyethylene ether prepared by adding 30 moles of ethylene oxide to oleylamine was treated for 1 hour at 90° C. with 22 gs. of sodium borohydride, whereby the color was reduced from 11 to 8 on the Gardner scale.

I claim:
1. A method of bleaching a polyalkylene ether of the formula $H(OR)_nX$ wherein R is selected from the group consisting of ethylene and propylene, $n$ is an integer greater than 1 and less than 80, and X is a residue of a compound containing a reactive hydrogen atom selected from the group consisting of water, ethanol nonylphenol, lauryl alcohol, tallow fatty alcohol, oleyl and cetyl alcohol and oleylamine, said method comprising treating the ether with 0.1 to 5% by weight of an alkali weight borohydride at a temperature of from 25–150° C.

2. A method of bleaching a polyalkylene glycol of the formula $H(OR)_nOH$ wherein R is selected from the group consisting of ethylene and propylene, and $n$ is an integer greater than 1 and less than 80, said method comprising treating the ether with 0.1 to 5% by weight of an alkali metal borohydride at a temperature of from 25–150° C.

References Cited in the file of this patent

UNITED STATES PATENTS

| | | |
|---|---|---|
| 2,111,820 | Steindorff et al. | Mar. 22, 1938 |
| 2,510,540 | Ballard et al. | June 6, 1950 |
| 2,677,700 | Jackson et al. | May 4, 1954 |
| 2,714,608 | Matter | Aug. 2, 1955 |
| 2,744,938 | Urban | May 8, 1956 |
| 2,778,854 | Stoltz | Jan. 22, 1957 |
| 2,801,268 | Brimer | July 30, 1957 |
| 2,846,457 | Zemlin et al. | Aug. 5, 1958 |
| 2,898,333 | Jullander | Aug. 4, 1959 |

OTHER REFERENCES

Hackh's Chemical Dictionary, 3rd ed. (1944), page 729.

Schechter et al.: Boron Hydrides and Related Compounds, 2nd ed. (1954), pages 39–52.